(12) United States Patent
Jacobs et al.

(10) Patent No.: US 10,783,577 B2
(45) Date of Patent: Sep. 22, 2020

(54) SYSTEMS AND METHODS FOR PROVIDING ENHANCED LOAN QUALIFICATION INFORMATION

(71) Applicant: Capital One Financial Corporation, McLean, VA (US)

(72) Inventors: Drew Jacobs, Arlington, VA (US); Luke A. Hammock, Washington, DC (US); Michael W. Upton, Charlotte, NC (US)

(73) Assignee: Capital One Financial Corporation, McLean, VA (US)

( * ) Notice: Subject to any disclaimer, the term of this patent is extended or adjusted under 35 U.S.C. 154(b) by 1030 days.

(21) Appl. No.: 14/532,938

(22) Filed: Nov. 4, 2014

(65) Prior Publication Data

US 2015/0127524 A1   May 7, 2015

Related U.S. Application Data

(60) Provisional application No. 61/899,948, filed on Nov. 5, 2013.

(51) Int. Cl.
  *G06Q 40/02* (2012.01)
(52) U.S. Cl.
  CPC .................. *G06Q 40/025* (2013.01)
(58) Field of Classification Search
  None
  See application file for complete search history.

(56) References Cited

U.S. PATENT DOCUMENTS

| | | | | |
|---|---|---|---|---|
| 8,296,323 B2* | 10/2012 | Pollard | ............. | G06Q 10/0637 |
| | | | | 707/784 |
| 8,433,650 B1* | 4/2013 | Thomas | ................ | G06Q 10/06 |
| | | | | 705/35 |
| 9,853,959 B1* | 12/2017 | Kapczynski | ............ | G06F 21/62 |
| 2009/0070178 A1* | 3/2009 | Gilbert | ................ | G06Q 10/109 |
| | | | | 705/7.19 |
| 2009/0319380 A1* | 12/2009 | Jacoby | ............... | G06Q 30/0277 |
| | | | | 705/14.73 |

(Continued)

OTHER PUBLICATIONS

Chunhui Piao, Study on Open APIs of e-Commerce Platforms and Design of a Third Party Application for Taobao, IEEE International Conference on E-Business Engineering, entire document pertitent (Year: 2010).*

*Primary Examiner* — Mohammad Z Shaikh
*Assistant Examiner* — Gregory S Cunningham, II
(74) *Attorney, Agent, or Firm* — Pillsbury Winthrop Shaw Pittman LLP

(57) ABSTRACT

Methods and systems are disclosed for providing enhanced information relating to terms for financing a purchase, such as a real estate purchase. According to disclosed embodiments, a financial service system collects financial information associated with the prospective buyer. The financial service system also configures a secure software object, or token, comprising the buyer's financial information. The financial service system transmits the token to various inventory listing sites. By utilizing graphical user interfaces on the inventory listing sites that integrate the transmitted token information, the prospective buyer is provided enhanced information for shopping and researching their purchase, including how the purchase and its financing fit into their overall financial profile.

18 Claims, 12 Drawing Sheets

(56) References Cited

U.S. PATENT DOCUMENTS

| | | | |
|---|---|---|---|
| 2013/0212704 A1* | 8/2013 | Shablygin | G06F 21/6218 726/28 |
| 2013/0339189 A1* | 12/2013 | Minerick | G06Q 30/0613 705/26.41 |
| 2014/0258063 A1* | 9/2014 | Chourasia | G06Q 30/0201 705/35 |
| 2014/0310153 A1* | 10/2014 | Patel | G06Q 40/025 705/38 |

* cited by examiner

1. About Yourself  2. About the Property  3. Your Solutions

First, we need to know a few things about you.

Will this be a joint application?  ○ Yes  ○ No

Are you Self-Employed?  ○ Yes  ○ No

What is your annual household income?  $ [____]

Enter the total minimum payment amount you pay each month on all debt, excluding your primary mortgage payment (i.e. required minimum monthly credit card payments, auto loans, student loans, mortgages you may have on 2nd homes or rental properties, alimony/child support)  $ [____]

Have you ever had a bankruptcy?  ○ Yes  ○ No

Have you ever had a property foreclosed upon or given title or deed in lieu of title in the last 7 years?  ○ Yes  ○ No How would you describe your credit?  [Please Select ▼]

[Back]  [Continue]

1. About Yourself  ›  2. About the Property  ›  3. Your Solutions

We need a few more details about the property.

What county is the property in? [Please Select ▼]

What is your annual homeowner's insurance? $ [_____]

What are your annual real estate taxes? $ [_____]

Will you be required to pay annual home owners association dues?  ○ Yes  ○ No

Is the property in a Planned Unit Development (PUD)?  ○ Yes  ○ No
Not sure? Here's an example: If you were to put up a fence, paint the house, or install a pool, would you need to get approval from some sort of homeowners or neighborhood association? If "yes", the property may be in a PUD.

Do you have a Purchase Agreement?  ○ Yes  ○ No
(A legal document containing the purchase price as well as the terms and conditions of the home you are buying.)

[Back]  [Continue]

FIG. 10

Adjustable Rate Mortgage
Low Rates, Low Closing Costs

Overview | Closing Costs

5/1 Adjustable Rate
Loan Amount: $35,604
Rate: 3.125%
Loan Payment: $152.53 Monthly
Taxes & Insurance: $916.67 estimated
Total Payment: $1,069.20 Monthly
Closing Costs: $6,994 estimated Knock $1,000 off your closing costs when you close on your Purchase or Refinance loan with us. Limited time only.

[Apply Now]

We believe you have the right to a mortgage that fits your needs and isn't filled with surprises. That's why we created the 5/1 Adjustable Rate offer.

It's a home loan built for the average American who moves or refinances every 5 to 7 years. Instead of paying a higher rate for a 30-year fixed mortgage, you'll pay a lower rate that fits the amount of time you'll keep your mortgage.

- Rates Guaranteed — Free 60 day rate guarantee for both purchases and refinances.
- Low closing costs — We keep the fees to a minimum. See for yourself.
- Right for you? — An ARM may be a good fit it.
  - You plan on staying in your home for a shorter period of time.
  - You want to pay less interest than a long term fixed-rate mortgage and potentially pay off your mortgage faster.

1. About Yourself > 2. About the Property > 3. Your Solutions

Solutions Menu
Back to Questions
- Compare Your Solutions
- 5/1 Adjustable Rate
- 7/1 Adjustable Rate
- 15 Year Fixed Rate
- 30 Year Fixed Rate
- Email These Solutions to Me

FIG. 11

SYSTEMS AND METHODS FOR PROVIDING ENHANCED LOAN QUALIFICATION INFORMATION

CROSS-REFERENCE TO RELATED APPLICATIONS

This application claims priority under 35 U.S.C. § 119 to U.S. Provisional Application No. 61/899,948, filed Nov. 5, 2013, which is expressly incorporated herein by reference in its entirety.

FIELD

The disclosed embodiments generally relate to financing sales of items and, in particular, providing prospective buyers of real estate with enhanced mortgage loan qualification information based on their personal financial profile.

BACKGROUND

The digital revolution has fundamentally changed how residential and commercial real estate is bought and sold. Prospective buyers were formerly at the mercy of real estate agents and mortgage lenders when attempting to shop for a new home. The basic question of "how much can I afford?" was often answered with inaccurate information or information that served the needs of parties other than the buyer.

As with many markets, the balance of power in the real estate market has shifted in the information age. With ample information now available online about homes for sale, such as tax values, the sale price of previous sales, detailed photographs and information, and the ability to comparison shop, prospective buyers are increasingly able to make more informed decisions when placing purchase offers. Numerous "mortgage calculators" have emerged online that allow buyers to reach some level of clarity with respect to how much they can reasonably afford, and how an individual property might fit into their plans. When used responsibly, these calculators can be valuable tools. But they can also be highly misleading to users. Many calculators take only a small amount of information about both the buyer and the property itself into account when recommending potential loan terms. Further, many calculator algorithms are overly simplified to attempt mass appeal. But because purchasing a home is the largest purchase most consumers will ever make, the costs associated with inaccurate or insufficient information can be very high. If a buyer makes a purchase decision based on inaccurate, outdated, or overly optimistic information, the consequences could include financial stress, foreclosure, and bankruptcy.

Accordingly, a need exists to provide technology capable of more quickly and accurately generating for prospective buyers of items, particularly real estate, enhanced information relating to financing while shopping for the desired item.

SUMMARY

Methods, systems, and articles of manufacture described herein enable a computer system to provide buyers of items, such as real estate, enhanced information relating to financing while researching the purchase. In one embodiment, a computing system may receive financial information associated with a buyer. Also, the computing system may configure an application programming interface component based on at least the received buyer financial information. The computing system may additionally configure controlled access for the application programming interface component, and transmit the application programming interface component to an external system associated with inventory listings of items for sale. Further, the computing system may determine financing information comprising prospective financing terms for at least one item contained within an inventory listing of the external system based on the buyer financial information associated with the transmitted application programming interface component. Finally, the computing system may transmit the determined financing information to the external system for use in configuring a graphical user interface component to display, at the external system, information associated with the at least one item and the determined financing information.

In another embodiment, a method for providing enhanced information relating to financing is disclosed. The method includes receiving financial information associated with a buyer. The method further comprises configuring, by an internal system, an application programming interface component based on at least the received buyer financial information. The method also includes configuring, by the internal system, controlled access for the application programming interface component, and transmitting the application programming interface component to an external system associated with inventory listings of items for sale. Further, the method comprises determining financing information comprising prospective financing terms for at least one item contained within an inventory listing of the external system based on the buyer financial information associated with the transmitted application programming interface component. Finally, the method comprises transmitting the determined financing information to the external system for use in configuring a graphical user interface component to display, at the external system, information associated with the at least one item and the determined financing information.

In yet another embodiment, a computing system may configure a display of one or more inventory listings of items for sale. The computing system may receive an application programming interface component from an external system comprising financial information associated with a prospective buyer of at least one of the items for sale associated with a displayed inventory listing. Further, the computing system may receive financing information from the external system relating to controlled access for the application programming interface component. Additionally, the computing system may configure a graphical user interface component comprising prospective financing terms information and information associated with the at least one item for sale. Finally, the computing system may display the configured graphical user interface to the prospective buyer.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings:

FIG. 8 is an exemplary user interface for receiving enhanced user information that may be provided by the disclosed embodiments;

FIG. 9 is an exemplary user interface for receiving information about a desired purchase that may be provided by the disclosed embodiments;

FIG. 10 is an exemplary user interface for receiving enhanced information about a desired purchase that may be provided by the disclosed embodiments;

FIG. 11 is an exemplary user interface for providing enhanced loan qualification information for a desired purchase that may be provided by the disclosed embodiments.

DETAILED DESCRIPTION

Figure 1:
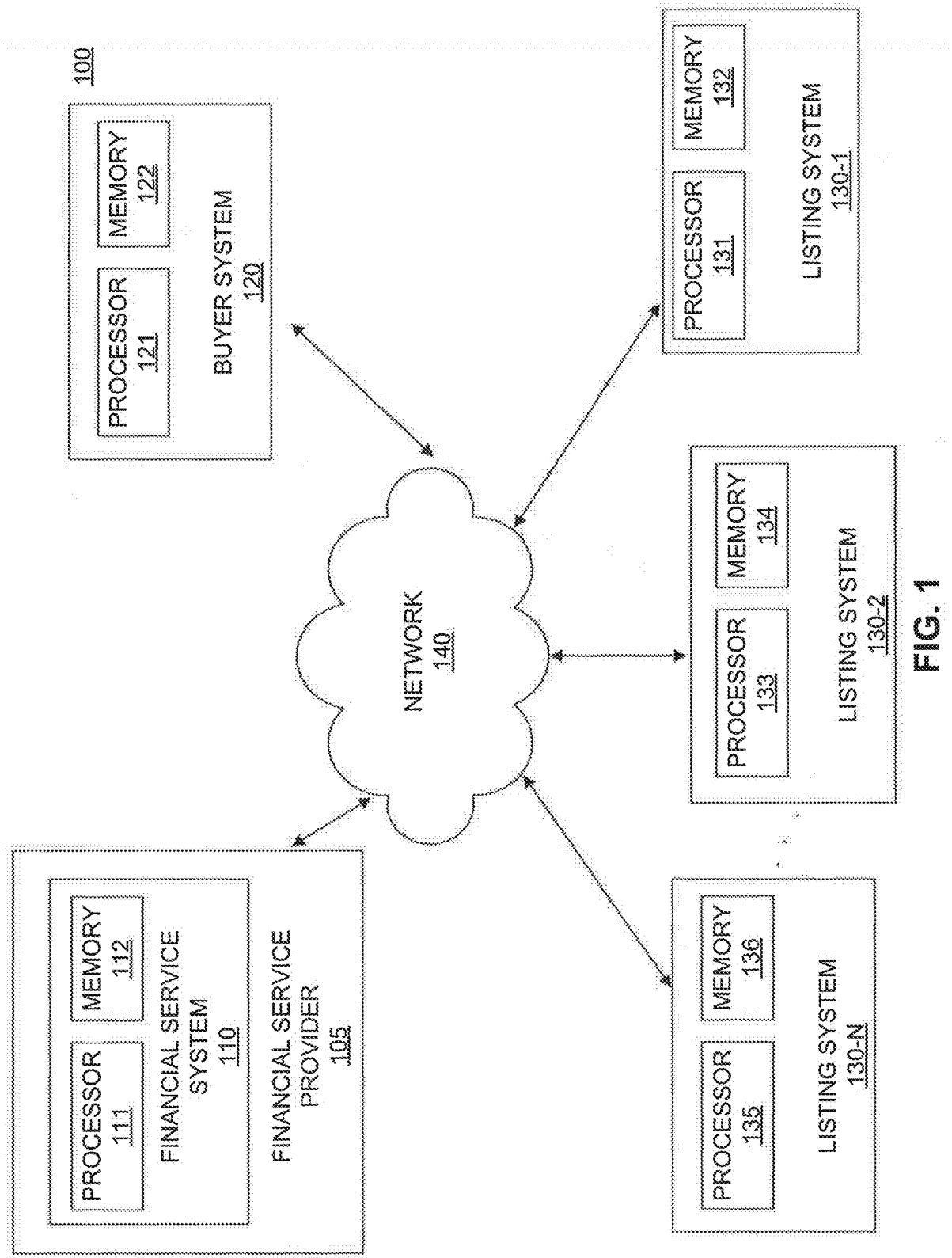
FIG. 1 illustrates an exemplary system consistent with disclosed embodiments.

Reference will now be made in detail to disclosed embodiments, examples of which are illustrated in the accompanying drawings. Wherever convenient, the same reference numbers will be used throughout the drawings to refer to the same or like parts.

Generally, disclosed embodiments are directed to systems and methods for providing buyers of an item requiring financing the ability to shop for the item with enhanced information about loan terms and the effect of the loan on their personal finances. For ease of discussion, embodiments may be described in connection with the sale of real estate, especially homes, and mortgage loans commonly used to finance their purchase. It is to be understood, however, that disclosed embodiments are not limited to the sale of real estate and may, in fact, be applied to the sale, auctioning, renting, etc. of any item, product, or service. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. The processes disclosed herein may be implemented by a suitable combination of hardware, software, and/or firmware. For example, the disclosed embodiments may implement computing systems that may be configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by computing systems as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

FIG. 1 illustrates an exemplary system 100 consistent with disclosed embodiments. In one aspect, system environment 100 may include a financial service provider 105, financial service system 110, buyer system 120, one or more listing systems 130, and network 140.

Financial service provider 105 may be one or more entities that configure, offer, provide, and/or manage financial service accounts, such as credit card accounts, debit card accounts, checking or savings accounts, loyalty accounts, and/or loan accounts. In one aspect, financial service provider 105 may include or be associated with financial service system 110 that may be configured to perform one or more aspects of the disclosed embodiments. In some embodiments, financial service system 110 may configure one or more loan accounts for users, such as a user operating buyer system 120, using information pertaining to one or more additional financial service accounts provided by financial service provider 105 associated with financial service system 110.

Financial service system 110 may be a system associated with one or more entities that configure, offer, provide, and/or manage financial service accounts, such as credit card accounts, debit card accounts, checking or savings accounts, and loan accounts. Consistent with the disclosure, financial service system 110 may provide a loan account for financing a purchase to one or more users operating buyer system 120. In some embodiments, the loan account may be a mortgage loan account. In some embodiments, financial service system 110 may receive and process payments from users (via, e.g., buyer system 120) relating to provided financial service accounts. In some embodiments, financial service system 110 may be configured to transmit financial information, such as that related to financial service accounts, creditworthiness, etc. related to one or more users operation buyer system 120, to one or more listing systems 130 to provide the user a more informed shopping and research experience in preparation for a purchase. Financial service system 110 may be configured to assess the creditworthiness and risk presented by a prospective home buyer in real-time or substantially real-time, and to offer different financing packages depending on those assessments.

Financial service system 110 may include one or more components that perform processes consistent with the disclosed embodiments. For example, financial service system 110 may include one or more computers (e.g., servers, database systems, etc.) configured to execute software instructions programmed to perform aspects of the disclosed embodiments, such as generating financial service accounts, maintaining accounts, processing information relating to accounts, etc. Consistent with disclosed embodiments, financial service system 110 may include other components and infrastructure that enable it to perform operations, processes, and services consistent with financial service account providers, such as banking operations, credit card operations, loan operations, etc. Consistent with disclosed embodiments, financial service system 110 may be configured to provide, manage, monitor, and assess a prospective financing program, such as a mortgage loan application process, for a purchase transaction involving buyer system 120.

Buyer system 120 may represent a system associated with an entity seeking to buy an item from another party. Although the following description of disclosed embodiments may refer to an "individual," it is to be understood that the same description applies to multiple buyers acting in concert or to a buyer entity in the manner described above. Buyer system 120 may include one or more components that perform processes consistent with the disclosed embodiments. For example, buyer system 120 may include one or more computers (e.g., servers, database systems, etc.) that are configured to execute software instructions programmed to perform aspects of the disclosed embodiments. One of ordinary skill in the art would recognize that buyer system 120 may include components and infrastructure that enable it to perform operations, processes, and services such as processing sales transactions of purchases made over the Internet or at POS locations, and communicating with financial service system 110 or other components relating to the transactions. Buyer system 120 may be configured to purchase an item, transmit and receive information associated with the purchase transaction, and process and monitor a loan account associated with financing the purchase transaction.

Listing system(s) 130-1 through 130-N may represent one or more systems configured to receive, process, display, and transmit information associated with items for sale, for example, homes and/or parcels of real estate. Although the following description of certain embodiments may refer to an "individual" listing system, one skilled in the art would appreciate that the same description applies to multiple systems acting in concert or to a corporate entity in the manner described above. In the example of real estate, in some embodiments, multiple listing systems 130 may be configured to access common inventory listing databases (not shown) which contain listing information relating to real estate for sale or rent. Listing systems 130 may be owned by the same entity or different entities. Listing system(s) 130 may include components and infrastructure that enable it to perform operations, processes, and services consistent with merchants, such as providing websites that offer for sale goods and/or services, processing sales transactions of purchases, and communicating with financial service system 110 or other components relating to the transactions. Consistent with disclosed embodiments, listing system(s) 130 may be configured to provide information related to purchase financing to the buyer of an item and assist with processing of a loan application.

Consistent with disclosed embodiments, components of system 100, including financial service system 110, buyer system 120, and listing system(s) 130, may include one or more processors (such as processors 111, 121, 131, 133, or 135) as shown in exemplary form in FIG. 1. The processors may be one or more known processing devices, such as a microprocessor from the Pentium™ family manufactured by Intel™ or the Turion™ family manufactured by AMD™. The processor may include a single core or multiple core processor system that provides the ability to perform parallel processes simultaneously. For example, the processors may be single core processors configured with virtual processing technologies known to those skilled in the art. In certain embodiments, the processors may use logical processors to simultaneously execute and control multiple processes. The processors may implement virtual machine technologies, or other similar known technologies to provide the ability to execute, control, run, manipulate, store, etc. multiple software processes, applications, programs, etc. In some embodiments, the processors may include a multiple-core processor arrangements (e.g., dual or quad core) configured to provide parallel processing functionalities to enable computer components of financial service system 110, buyer system 120, and/or listing system(s) 130 to execute multiple processes simultaneously. Other types of processor arrangements could be implemented that provide for the capabilities disclosed herein. Moreover, the processors may represent one or more servers or other computing devices that are associated with financial service system 110, buyer system 120, and/or listing system(s) 130. For instance, the processors may represent a distributed network of processors configured to operate together over a local or wide area network. Alternatively, the processors may be a processing device configured to execute software instructions that receive and send information, instructions, etc. to/from other processing devices associated with financial service provider 110 or other components of system environment 100. In certain aspects, processors 111, 121, 131, 133, and 135 may be configured to execute software instructions stored in memory to perform one or more processes consistent with disclosed embodiments. Moreover, processors 111, 121, 131, 133, and 135 may execute one or more programs located remotely from financial service system 110, buyer system 120, or listing systems 130-1 through 130-N, respectively.

Consistent with disclosed embodiments, components of system 100, including financial service system 110, buyer system 120, and listing system(s) 130, may also include one or more memory devices (such as memories 112, 122, 132, 134, and 136) as shown in exemplary form in FIG. 1. The memory devices may store software instructions that are executed by processors 111, 121, 131, 133, and 135, such as one or more applications, network communication processes, operating system software, software instructions relating to the disclosed embodiments, and any other type of application or software known to be executable by processing devices. The memory devices may be a volatile or non-volatile, magnetic, semiconductor, tape, optical, removable, nonremovable, or other type of storage device or non-transitory computer-readable medium. The memory devices may be two or more memory devices distributed over a local or wide area network, or may be a single memory device. In certain embodiments, the memory devices may include database systems, such as database storage devices, including one or more database processing devices configured to receive instructions to access, process, and send information stored in the storage devices. By way of example, database systems may including Oracle™ databases, Sybase™ databases, or other relational databases or non-relational databases, such as Hadoop sequence files, HBase, or Cassandra.

In some embodiments, financial service system 110, buyer system 120, and listing system(s) 130 may also include one or more additional components (not shown) that provide communications with other components of system environment 100, such as through network 140, or any other suitable communications infrastructure.

Network 140 may be any type of network that facilitates communications and data transfer between components of system environment 100, such as, for example, financial service system 110, buyer system 120, and listing system(s) 130. Network 140 may be a Local Area Network (LAN), a Wide Area Network (WAN), such as the Internet, and may be a single network or a combination of networks. Further, network 140 may reflect a single type of network or a combination of different types of networks, such as the Internet and public exchange networks for wireline and/or wireless communications. Network 140 may utilize cloud computing technologies that are familiar in the marketplace. Moreover, any part of network 140 may be implemented through traditional infrastructures or channels of trade, to permit operations associated with financial accounts that are performed manually or in-person by the various entities illustrated in FIG. 1. Network 140 is not limited to the above examples and system 100 may implement any type of network that allows the entities (and others not shown) included in FIG. 1 to exchange data and information.

Although FIG. 1 describes a certain number of entities and processing/computing components within system environment 100, any number or combination of components may be implemented without departing from the scope of the disclosed embodiments. For example, different listing systems 130 may interact with one or more buyer systems 120 through network 140 or standard channels of trade, such as face-to-face purchase transactions or brick-and-mortar locations. In another example, different financial service systems 110 may interact with one or more buyer systems 120 and listing systems 130 through network 140 or standard channels of trade. Additionally, financial service system 110, buyer system 120, and listing system(s) 130 are not mutually exclusive. For example, in one disclosed embodiment, financial service system 110 and one or more listing systems 130 may be the same entity or affiliated with the same entity. The entities as described are not limited to their discrete descriptions above. Further, where different components of system environment 100 are combined (e.g., financial service system 110 and one or more listing systems 130, etc.), the computing and processing devices and software executed by these components may be integrated into a local or distributed system.

Figure 2:
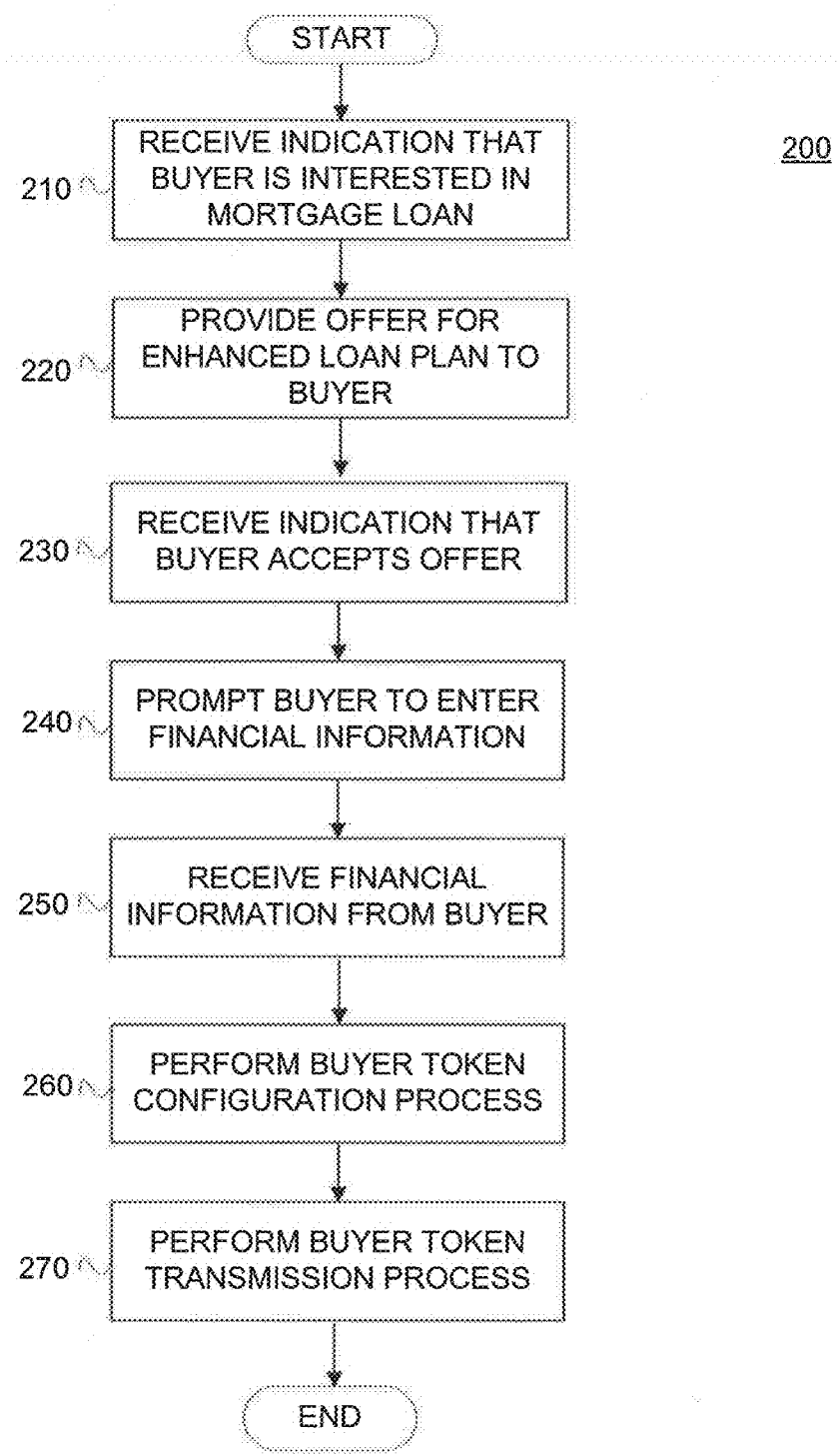
FIG. 2 is a flowchart of an exemplary buyer information collection process, consistent with disclosed embodiments.

FIG. 2 illustrates an exemplary buyer information collection process 200, consistent with disclosed embodiments. As an example, FIG. 2 is disclosed in connection with financial service system 110, but it is understood that other components may perform processes to collect various types of information from a prospective buyer, such as through one or more listing systems 130. Financial service system 110 may receive an indication that a user, such as a prospective buyer operating buyer system 120, is interested in pursuing financing for purchase of an item (Step 210). In some embodiments, the item may be a parcel of real estate (and may further comprise a home or other dwelling situated on the parcel), and the financing may comprise a mortgage loan. In some embodiments, system 110 may receive the Indication via a stand-alone kiosk or other such unit within a brick and mortar banking location. The kiosk and/or brick and mortar location may be associated with financial service provider 105. In alternative embodiments, the stand-alone kiosk may be situated within a location associated with a listing system 130, or at a location affiliated with other merchants, such as a home builder's trade show or a retail shopping mall. Financial service system 110 may receive the indication from buyer system 120 via telephonic or electronic communication, or by any other suitable means of communication.

Financial service system 110 may prepare and provide an offer for an enhanced loan financing plan to buyer system 120 (Step 220). Financial service system 110 may notify buyer system 120 of the offer through telephonic electronic communication means, or by any suitable well-known means of communication. In some embodiments, receiving the indication of buyer interest in Step 210 and making the offer in Step 220 may occur substantially simultaneously. In alternative embodiments, making the offer may occur at a later time following receipt of the indication of interest. In some embodiments, financial service system 110 may determine that additional information is required in order to make the determination of whether or not to make the offer to buyer system 120. In these embodiments, financial service system 110 may request the additional information from buyer system 120 through telephonic or electronic communication means. Financial service system 110 may receive an Indication that the user operating buyer system 120 accepts the offer to participate in the enhanced loan program, also via telephonic or electronic communication means (Step 230).

Financial service system 110 may prompt buyer system 120 to enter or otherwise provide financial information associated with the prospective buyer (Step 240). In some embodiments, the financial information may include detailed financial information, such as information relating to investments, debts, financial goals, taxes, or other information associated with the prospective buyer. In some embodiments, the user operating buyer system 120 may be an existing customer of financial service provider 105, and at least some of the information prompted for and requested may be sought from financial service system 110. In other embodiments, the user operating buyer system 120 may be an existing customer of financial service provider 105, and the information prompted for may be sought for purposes of supplementing financial information already retained within financial service system 110 (for example, stored in memory 112) associated with the buyer. In still other embodiments, the user may not be an existing customer of financial service provider 105, and the information prompted for and requested may be more extensive than for existing customers. Financial service system 110 may additionally be configured to perform a verification step (not shown) in which financial service system 110 may prompt buyer system 120 to verify the information received in Step 220. For example, financial service system 110 may require buyer system 120 to submit additional information, or to stipulate to the veracity of any and all information previously received.

Financial service system 110 may receive the prompted-for financial information from buyer system 120 (Step 250), via telephonic or electronic communication means.

At Step 260, financial service system 110 may perform a buyer token configuration process, such as is disclosed below in connection with FIG. 5. In brief, according to some embodiments, financial service system 110 may configure a software object comprising an application programming interface. Financial service system 110 may populate the software object with information associated with a prospective buyer of an item, such as the user associated with buyer system 120 and the information received in Step 250. Financial service system 110 may store the personalized software object, or token, in memory or on an external server. Additionally, financial service system 110 may configure security for the token to protect the privacy and fidelity of the buyer-provided information.

Figure 6:
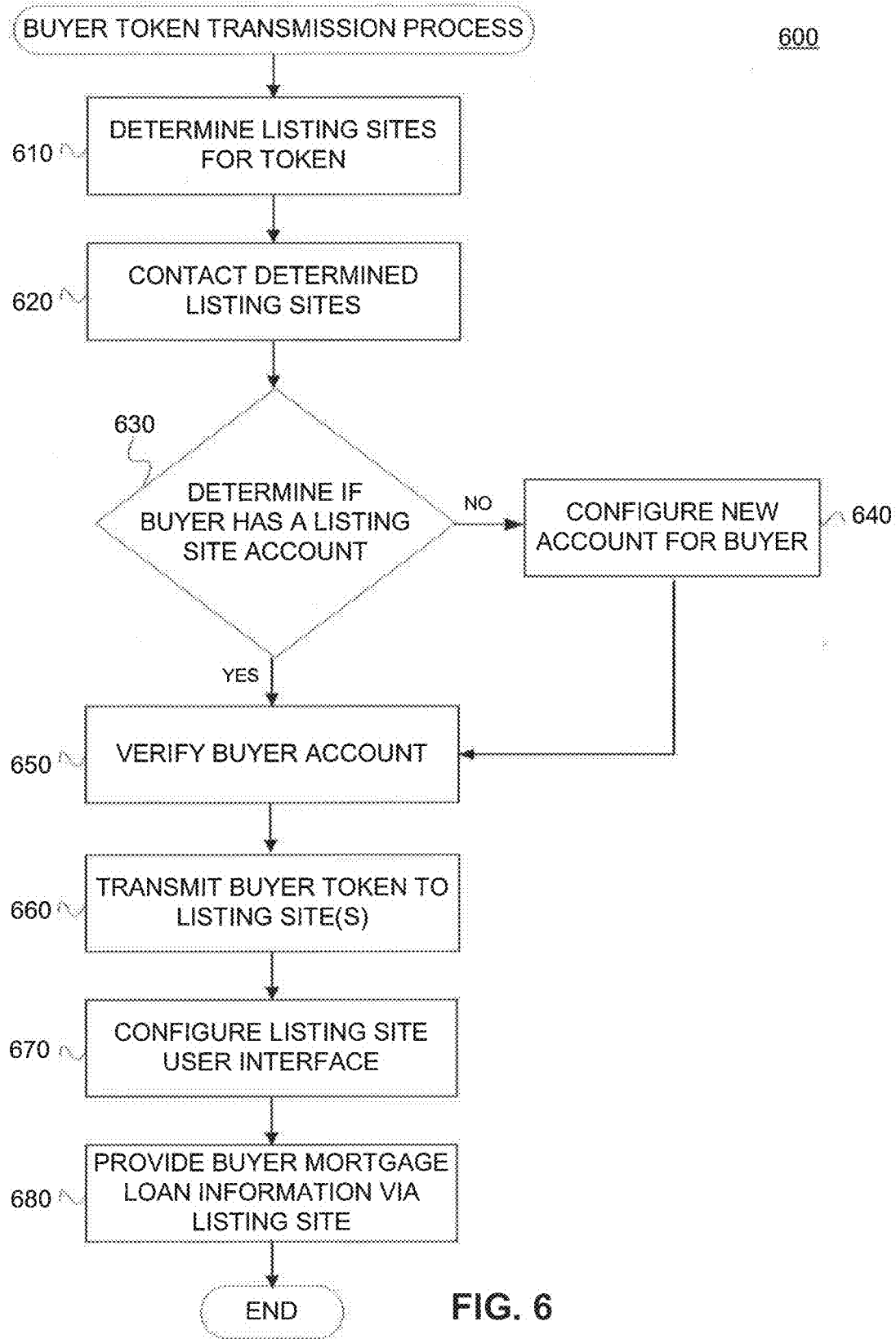
FIG. 6 is a flowchart of an exemplary buyer token transmission process, consistent with disclosed embodiments.

At Step 270, financial service system 110 may perform a buyer token configuration process, such as is disclosed below in connection with FIG. 6. In brief, according to some embodiments, financial service system 110 may determine one or more listing systems 130 to associate with the buyer token configured in Step 260. Financial service system 110 may contact the one or more listing systems 130 and determine if the buyer associated with buyer system 120 has a previously configured account on the website or websites associated with listing system(s) 130. If the buyer does not have a prior account, financial service system 110 may configure an account for the buyer. If the buyer does have an account, the account may be verified by financial service system 110. Financial service system 110 may transfer the configured buyer token to listing systems 130, and may assist listing system 130 in configuring the listing site user interface to accommodate the buyer financial information contained in the token. Additionally, financial service system 110 may provide buyer mortgage loan information via the configured listing website.

Figure 3:
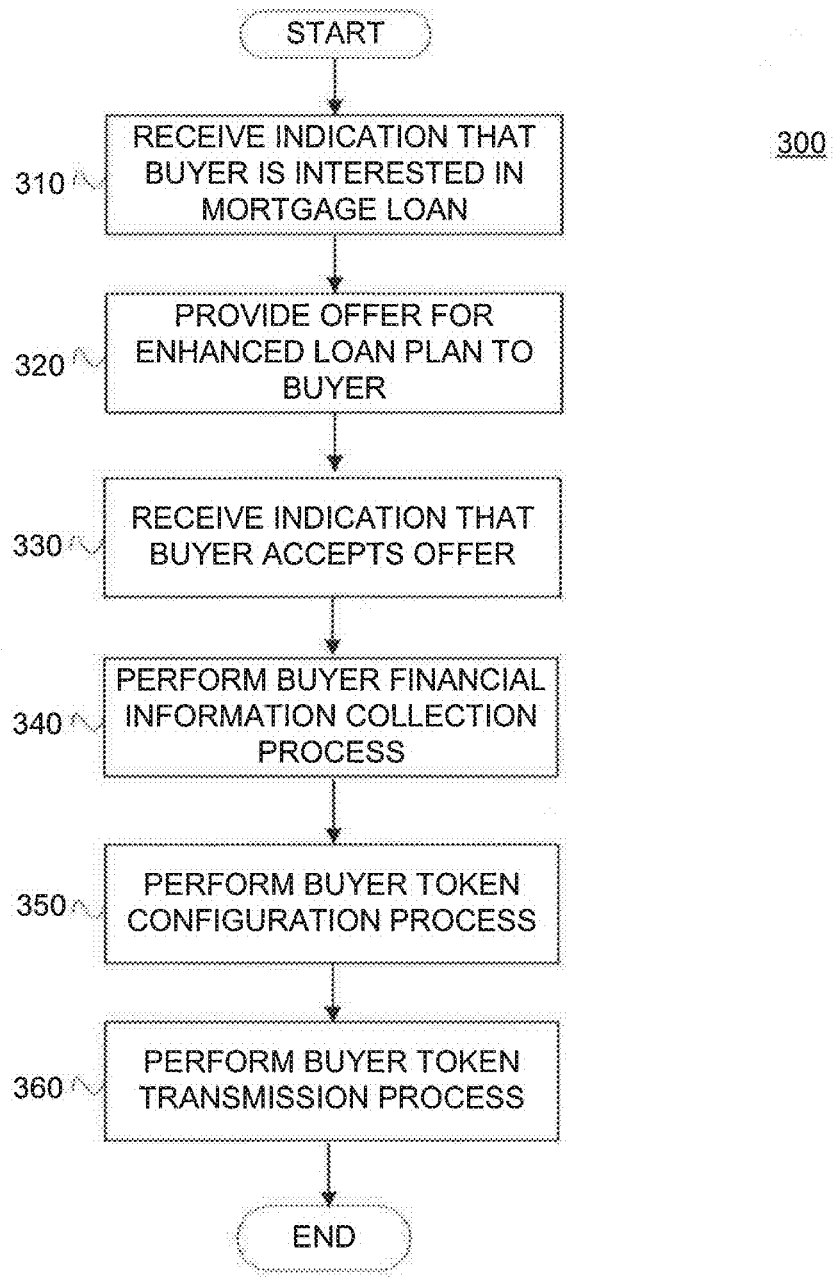
FIG. 3 is a flowchart of an exemplary buyer information collection process, consistent with disclosed embodiments.

FIG. 3 illustrates an exemplary buyer information collection process 300 consistent with disclosed embodiments. As an example, FIG. 3 is disclosed in connection with financial service system 110, but it is understood that other components may perform processes to collect various types of information from a prospective buyer, such as one or more listing systems 130. In some embodiments, buyer information collection process 300 may be similar to buyer information collection process 200. Buyer information collection process 300, however, may include financial service system 110 automatically collecting the financial information instead of collecting the information by prompting buyer system 120. For these reasons, buyer information collection process 300 may be advantageously utilized by financial service system 110 to collect information from prospective buyers that are already customers of financial service provider 105. Conversely, buyer information collection process 200 may be advantageously used by financial service system 110 to collect information from prospective buyers associated with buyer system 120 that are either new customers of financial service provider 105 or not customers of financial service provider 105 at all.

Financial service system 110 may receive an indication that a user, such as a user operating buyer system 120, is interested in pursuing financing for purchase of an item (Step 310). In some embodiments, the item may be a parcel of real estate (and may further comprise a home or other dwelling situated on the parcel), and the financing may comprise a mortgage loan. In some embodiments, system 110 may receive the indication via a stand-alone kiosk or other such unit within a brick and mortar banking location. The kiosk and/or brick and mortar location may be associated with financial service provider 105. In alternative embodiments, the stand-alone kiosk may be situated within a location associated with a listing system 130, or at a location affiliated with other merchants, such as a home builder's trade show or a retail shopping mall, for example. Financial service system 110 may receive the indication from buyer system 120 via telephonic or electronic communication means, or by any other suitable means of communication.

In some embodiments, financial service system 110 may optionally prepare and provide an offer for an enhanced loan financing plan to buyer system 120 (Step 320). Financial service system 110 may notify buyer system 120 of the offer through telephonic or electronic communication means, or by any suitable well-known means of communication. In some embodiments, receiving the indication of buyer interest in Step 310 and making the offer in Step 320 may occur substantially at the same time. In alternative embodiments, the offer may occur at a time subsequent to receiving the indication of interest. In some embodiments, financial service system 110 may determine that additional information is required in order to make the determination of whether or not to make the offer to buyer system 120. In these embodiments, financial service system 110 may request the additional information from buyer system 120 through telephonic or electronic communication means. Financial service system 110 may receive an indication that the user operating buyer system 120 accepts the offer to participate in the enhanced loan program (Step 330), also via telephonic or electronic communication means.

At Step 340, financial service system 110 may perform a buyer financial information collection process, such as is disclosed below in connection with FIG. 4. In brief, according to some embodiments, financial service system 110 may determine if the prospective buyer associated with buyer system 120 is associated with an existing financial service account. If not, financial system 110 may configure a new account for the buyer. Once the new account is configured, or once system 110 determines that a prior account exists, the account is verified. Financial service system 110 may gain access to the financial service account configured for the prospective buyer. Depending on the circumstances of the buyer (such as marital status, legal statuses including bankruptcy or previous foreclosure, other outstanding debts, etc.) or other predetermined criteria, such as preferences of a target listing system 130, a specific type of financing desired (for example, a VA or FHA loan), preferences of the underwriter of the prospective financing (for example, financial service provider 105), or legal restrictions, financial service system 110 may determine a subset of buyer financial information required to process enhanced loan information. In some embodiments, financial service system 110 may consider additional information in determining the necessary information, such as the geographical location of the prospective buyer, or the identity of a particular lender preferred by the prospective buyer. In these embodiments, financial service system 110 may determine financial information that the preferred lender requires in order to initiate financing, and may collect the subset of information from buyer system 120 on that basis. System 110 may automatically collect the required information, and may prompt the buyer to verify or supplement the collected information.

At Step 350, financial service system 110 may perform a buyer token configuration process, such as is disclosed in brief above in association with Step 260 and disclosed in additional detail below in connection with FIG. 5. At Step 360, financial service system 110 may perform a buyer token configuration process, such as is disclosed in brief above in association with Step 270 and disclosed in additional detail below in connection with FIG. 6.

Figure 4:
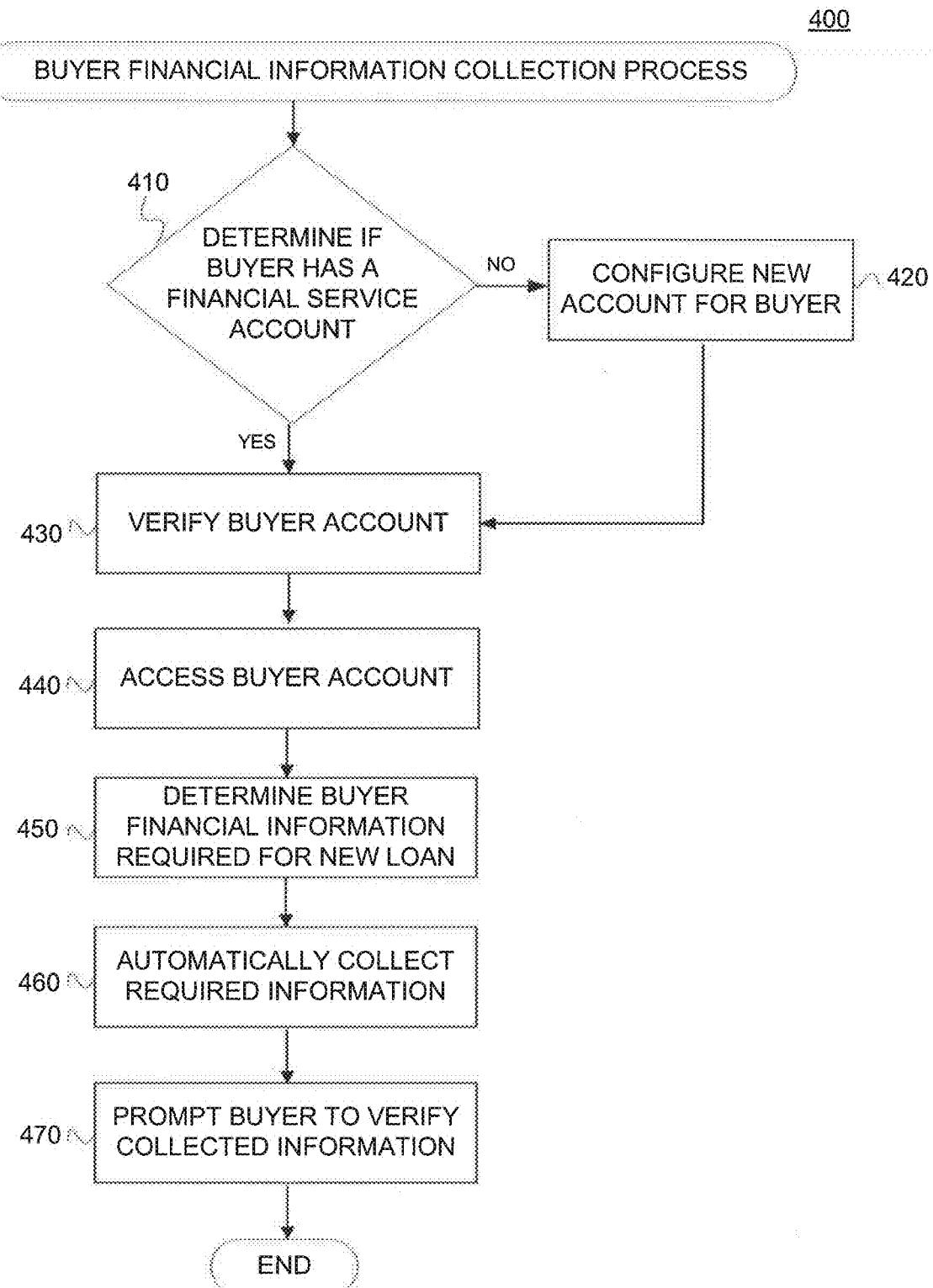
FIG. 4 is a flowchart of an exemplary buyer financial information collection process, consistent with disclosed embodiments.

FIG. 4 illustrates an exemplary buyer financial information collection process 400, consistent with disclosed embodiments. Buyer financial information collection process 400, as well as any or all of the individual steps therein, may be performed by any one or more components of system 100, including financial service system 110, buyer system 120, or listing system(s) 130. For exemplary purposes, FIG. 4 is disclosed as being performed by financial service system 110.

Financial service system 110 may determine whether a prospective buyer of an item is associated with an existing financial service account (Step 410). In some embodiments, the prospective buyer may be the user operating buyer system 120. In some embodiments, the existing financial service account may be an account provided by financial service provider 105. In other embodiments, the existing account may be an account provided by a financial service provider other than financial service provider 105. Financial service system 110 may make the determination regarding an existing account for the buyer via a search of internal memory 112, a search of an associated internal database (not shown), or a search via network 140.

If financial service system 110 determines that the prospective buyer does not have a financial service account, or alternatively, determines that the prospective buyer does not have a financial service account provided by financial service account provider 105 (Step 410: NO), then financial service system 110 may configure a new financial service account for the prospective buyer (Step 420). The new financial service account may be configured using information about the prospective buyer received during buyer information collection process 200, buyer information collection process 300, or both. In some embodiments, financial service system 110 may prompt the prospective buyer and/or buyer system 120 anew for relevant information as part of configuring the new account. Information required to configure the account may include one or more of a name, an address, a social security number or other government identification information, financial history, employment history, or creditworthiness information. It is understood that this list of information is exemplary only, and that for any given prospective buyer, financial service system 110 may seek or require more or less information in order to configure a new account.

If financial service system 110 determines that the prospective buyer does have a financial service account (Step 410: YES), or if a new account is configured as part of Step 420, financial service system 110 may verify various details and information relating to the financial service account (Step 430). In some embodiments, financial service system 110 may verify the account by prompting buyer system 120 to transmit corroborating documents. In other embodiments, financial service system 110 may verify the account by corroborating information via a third party over network 140. The third party may be, for example, a credit bureau, an employment verification service, a government database, or any other source of information that may contain information associated with the prospective buyer.

Once the prospective buyer's financial service account is configured and/or verified, financial service system 110 may access the account (Step 440). In some embodiments, the buyer's account may be configured such that financial service system 110 may freely access the account with no additional steps necessary. For example, financial service system 110 may freely access the account with no additional steps if the account is managed by financial service provider 105. In other embodiments, where the account is not associated with provider 105 and/or system 110, financial service system 110 may contact the entity responsible for managing the account for permissions and instructions relating to account access. In still other embodiments, financial service system 110 may contact buyer system 120 directly to obtain account access. In these embodiments, financial service system 110 may receive account access credentials from buyer system 120. Alternatively, buyer system 120 may access the account, and then may grant financial service system 110 simultaneous or subsequent access to the account. The account access credentials may include the identity of the financial service account provider, the identity of an account (e.g., account number(s), etc.), the identity of other accounts (e.g., one or more additional financial accounts may be associated with the user), and/or credentials that enable financial service system 110 to access, receive, and/or store information relating to the user's account. In some embodiments, the credentials may include biometric or other physical characteristics provided by the user to access the account. In other embodiments, the credentials may include physical devices required for access, such as a key, dongle, card, or other such device.

Financial service system 110 may determine a subset of buyer financial information that is required in order to provide enhanced loan information (Step 450). The information required may vary depending on several factors, including but not limited to legal requirements of the geographical jurisdiction, financial history of the prospective buyer, parameters of the target listing system(s) 130, whether the prospective buyer is seeking to buy or rent the property/item, time constraints, availability of the information, prior experience with the prospective buyer, etc. In some embodiments, the determination of information required may be made based on prior loans provided by financial service system 110.

The buyer financial information required in order to provide the disclosed enhanced loan information may, for example, comprise all assets and debts of the prospective buyer, information on monthly recurring bills, the prospective buyer's credit score, and whether or not the prospective buyer currently owns a home and, if so, whether or not that property will be sold prior to assumption of the new loan. The information may, where necessary, further comprise insurance holdings of the user, tax liabilities, medical history, employment history, income history, marital status, and dependency status. In embodiments where the prospective buyer is determined to have a spouse and/or dependents, the required information may include financial information associated with those individuals. The required financial information may further comprise information about utilities for the desired property, information relating to home improvements, educational debt status, or citizenship status. It is understood that the financial information required may vary, and that financial service system 110 may require more or less information in order to provide the disclosed goods and services.

Financial service system 110 may be configured to automatically collect the subset of determined required financial information (Step 460). In disclosed embodiments, financial service system may collect buyer financial information through, for example, fetching data using the buyer's provided credentials or by using technologies that provide account scraping (e.g., automatically collecting information about a customer's existing account). In some embodiments, financial service system 110 may capture buyer financial information from an existing account associated with the prospective buyer within personal financial management software or data associated with another system (such as buyer system 120) or application, such as stand-alone software applications like Quicken® and/or web applets like Mint®. In some embodiments, automatically collecting the data may also comprise parsing the collected data. For example, in one embodiment, financial service system 110 may take buyer financial information in a raw, unclassified format as it exists or is collected from the prospective buyer's electronic account records. For example, a buyer's account statement may be accessed in an unclassified and raw format, or the electronic data representing the buyer's financial information may be formatted in raw text file format. These examples are not intended to be limiting, and financial service system 110 may use any necessary means to automatically collect the required financial information from the buyer. In alternative embodiments where automatic collection of data is not possible, not feasible, or incomplete, financial service system 110 may instead automatically prompt buyer system 120 to manually supplement the financial information.

In some embodiments, financial service system 110 may, as an optional security and quality assurance measure, prompt buyer system 120 to verify the collected financial information (Step 470). In some embodiments, the prompt for verification may occur via a graphical user interface on an internet website over network 140. In other embodiments, buyer system 120 may be prompted to verify the information via telephonic, facsimile, or other suitable communication means. Financial service system 110 may verify the information through a series of questions and answers. For example, financial service system 110 may request information from buyer system 120 in response to the question, "Which of these entities administers the educational loan that you took out in 2009?" and list a plurality of possible answers for buyer system 120 to select from. In some embodiments, for added security, the correct answer may be none of the presented options, and an option such as "None of these" or "None of the above" may be presented to buyer system 120 for selection. In alternative embodiments, financial service system 110 may verify the collected information through other means, such as comparing the collected data to internal records associated with financial service provider 105 stored in memory 112, or by completing a search of internet-based records via network 140.

Figure 5:
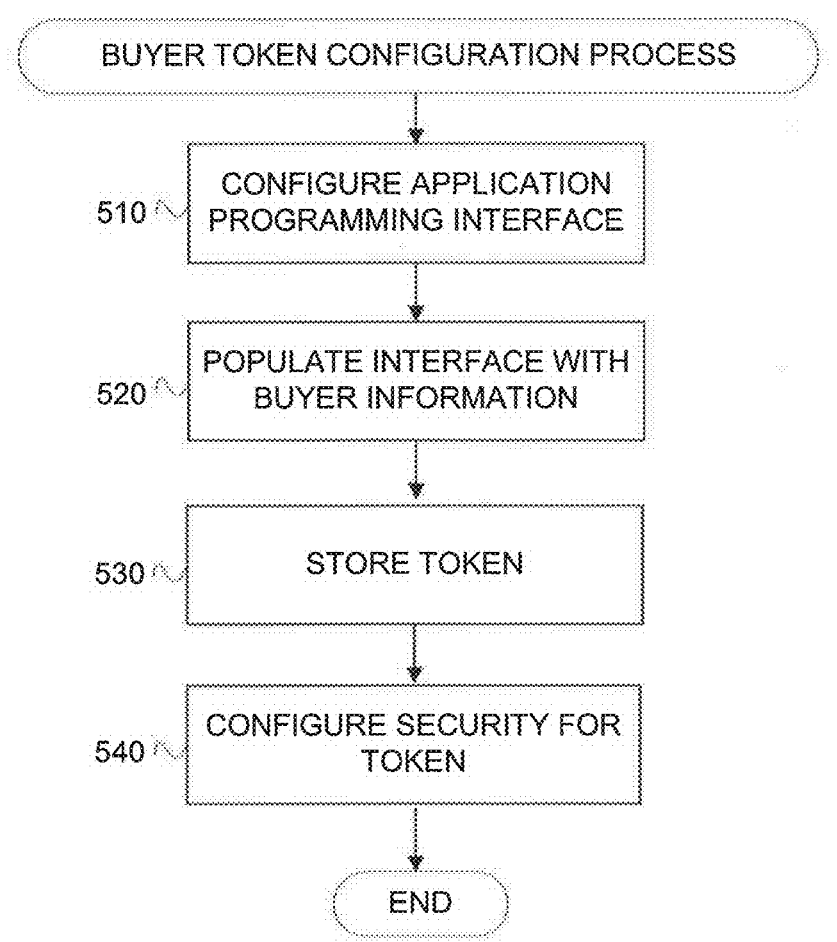
FIG. 5 is a flowchart of an exemplary buyer token configuration process, consistent with disclosed embodiments.

FIG. 5 illustrates an exemplary buyer token configuration process 500, consistent with disclosed embodiments. Buyer token configuration process 500, as well as any or all of the individual steps therein, may be performed by one or more of financial service system 110, buyer system 120, or listing system(s) 130. For exemplary purposes, FIG. 5 is disclosed as being performed by financial service system 110.

Financial service system 110 may configure a software object, such as an application programming interface, relating to the financial information collected in processes 200, 300, and 400 described previously (Step 510). The software object, or "buyer token," may be configured as a vehicle for presenting the collected buyer financial information to external parties, such as listing system(s) 130.

The buyer token may contain various categories or arrangements of the financial information such that different users accessing the token may be able to access different subsets of the information. For example, a particular listing system 130 may be preferred by one or both of financial service system 110 or buyer system 120, and in those embodiments the token may be configured to provide the preferred listing system 130 access to additional information or enhanced information as compared to other listing systems 130. In some embodiments, the financial information within the token may be programmed within standardized fields; for example, fields that can interface with an existing system, such as a particular Multiple Listing Service (MLS) or any similar system. Fields may also be configured as custom fields if not standardized.

Upon configuring the buyer token, financial service system 110 may populate the various fields with the collected buyer financial information (Step 520). In some embodiments, processor 111 may be configured to automatically transfer the collected information from memory 112 or another storage device associated with financial service system 110 to the configured buyer token. In other embodiments, one or more individuals associated with financial service system 110, buyer system 120, or listing system(s) 130 may manually enter and verify the financial information within the configured buyer token. Financial service system 110 may store one or more copies of the configured, populated buyer token in memory 112, internal or external database (not shown), and/or remotely via network 140 (Step 530).

Financial service system 110 may configure controlled access or security for the configured buyer token (Step 540). The financial information contained within the token is invariably sensitive, private information and, before the token leaves the secured environment of financial service system 110, steps must be taken to ensure that only intended parties are able to access, view, and use the information. In some embodiments, financial service system 110 may configure encryption for the token. In other embodiments, financial service system 110 may implement a password protection scheme for the token. In these embodiments, the password protection may further comprise configuration and implementation of additional security questions to further limit access. In some embodiments, financial service system 110 may generate terms of service or other similar security and usage agreements, and require acknowledgement of the terms of service by one or more of buyer system 120 or listing system 130. The token may be configured with one or more layers of required authorization (for example, using the OAuth 2 standard), and may require authorization by one or both of buyer system 120 or listing system 130 to display or access data contained within the token. Financial service system 110 may configure the token in a manner such that the sensitive financial data cannot be downloaded onto the systems of any end user. In some embodiments, the configured security credentials may include biometric or other physical characteristics provided by one or more of financial service system 110 or buyer system 120 to access the account. In other embodiments, the credentials may include physical devices required for access, such as a key, dongle, card, or other such device. Financial service system 110 may further configure the token to only be operable under Hypertext Transfer Protocol Secure (HTTPS) or other comparable security protections over network 140. In some embodiments, financial service system 110 may require a digital signature of a prospective user of the token (such as listing system 130) to be verified prior to access. These examples are not intended to be limiting, and financial service system 110, buyer system 120, and listing system(s) 130 may configure any security measures deemed necessary for the buyer token.

In some embodiments, the features and functionalities associated with the enhanced financial information collected for various buyer systems 120 by financial service system 110 may be integrated with a website, mobile application, or other such online presence associated with one or more listing systems 130. FIG. 6 illustrates an exemplary buyer token transmission process 600 consistent with certain disclosed embodiments. Process 600, as well as any or all of the individual steps therein, may be performed by any one or more of financial service system 110, buyer system 120, or listing system(s) 130. For exemplary purposes, FIG. 6 is disclosed as being performed by financial service system 110.

Financial service system 110 may determine one or more listing systems 130 for potential use and comparison by buyer system 120 (Step 610). The targeted set of listing systems may be broad and comprise many or all currently existing listing systems, or the set may be limited based on various criteria. Non-limiting examples of national listing systems 130 include Zillow®, Trulia®, Redfin®, etc. In some embodiments, financial service system 110 may choose to target only these national listing systems 130 with the buyer token. In other embodiments, buyer system 120 may request certain listing systems 130 be included. Financial service system 110 may target more localized listing systems 130 as well, such as localized Multiple Listing Service (MLS) systems that may be proprietary or public. In some embodiments, financial service system 110 may determine that one or more of the candidate listing systems 130 may be technically incompatible with the software or security elements of the buyer token. In these embodiments, financial service system 110 and/or the incompatible listing system 130 may alter one or more elements of the token in order to ensure compatibility.

Financial service system 110 may contact the identified listing systems 130 for logistical purposes (Step 620). For example, the contact may be requested by system 110 in order to ensure compatibility of the buyer token, as discussed above. In some embodiments, contact may be required to ensure or conform security protocols for the configured buyer token information. Contact may also be desired to begin the process of determining how the token information may be incorporated into the listing system 130 and eventually presented to buyer system 120. Financial service system 110 may contact listing system(s) 130 by telephonic, facsimile, or other electronic means.

As part of the contact between systems 110 and 130, financial service system 110 may determine, with the help of listing system 130, whether or not the prospective buyer associated with buyer system 120 has an account, login, alias, or other configured online presence with the particular listing system 130 (Step 630). Financial service system 110 may provide identifying information associated with the prospective buyer to listing system 130 for the purposes of the determination. For example, financial service system 110 may provide one or more of an email address, a login ID, an Internet Protocol (IP) address, geographic location information, or the prospective buyer's given name to listing system 130. Listing system 130 may also perform a search of records associated with its system to determine whether the prospective buyer has previously requested and configured an online presence with system 130. Such a search may be conducted via network 140 on a remote server, or may comprise a local search of memory 132.

According to some embodiments, an account or other such online presence for the prospective buyer may be necessary in the context of listing system 130 so that the information contained in the buyer token can be presented to the buyer in a relevant and secure manner. Accordingly, if financial service system 110 and listing system 130 together determine that the prospective buyer associated with buyer system 120 does not have a prior account/presence with the listing system 130 (Step 630: NO), financial service system 110 may assist listing system 130 in creating and configuring a new account/presence for the buyer (Step 640). In some embodiments, financial service system 110 may prompt buyer system 120 for permission to create the account. Listing system 130 may also prompt buyer system 120 for any additional information required to configure the account that is not contained in the configured buyer token or in any other communications received from financial service system 110.

If financial service system 110 determines that the prospective buyer has an existing account/presence with listing system 130 (Step 630: YES), or if a new account/presence is configured at Step 640, financial service system 110 may verify the buyer's account with listing system 130 (Step 650). In some embodiments, financial service system 110 may verify the account by prompting buyer system 120 or listing system 130 to transmit corroborating documents. In other embodiments, financial service system 110 may verify the account by corroborating information via a third party over network 140.

Once contact has been established with the desired listing system 130 and the prospective buyer's account with that system is confirmed, financial service system 110 may transmit the buyer token to listing system 130 (Step 660). In some embodiments, financial service system 110 may transmit the configured buyer token to listing system 130 via a secured connection over network 140. In other embodiments, financial service system 110 may transmit the configured buyer token via physical media. For example, the token may be embodied on a non-transitory computer readable medium that is sent to a physical location associated with listing system 130 via postal mail or other commercial shipping means. In still other embodiments, financial service system 110 may provide the token to buyer system 120 via either of the above means, and buyer system 120 may transmit or utilize the token in interactions with listing system 130. Any means of transmitting the token may be used, and one particular method may be preferable to others for a given set of circumstances surrounding the component members of system environment 100.

Once in possession of the configured buyer token, listing system 130 may exchange data with financial service system 110 in order to configure a graphical user interface to incorporate and present the token information to buyer system 120 so as to assist with research associated with the purchase of a property/item (Step 670). In some embodiments, the buyer financial information contained within the token may be incorporated as an additional "add-on" to graphical user interfaces already configured for listing system 130. In other embodiments, financial service system 110 and/or listing system 130 may configure a dedicated graphical user interface solely for the subset of listing system 130 users that are associated with tokens such as those disclosed in the above embodiments. Financial service system 110 may generate a "base" graphical user interface that may be adapted by various listing systems 130 to integrate with existing design elements, or in some embodiments, may provide a style guide or other suggested presentation to listing system 130. In these embodiments, the suggested presentation may comprise, for example, an HTML and/or CSS sheet providing exemplary formatting guidelines for the graphical user interface. Alternatively, the token itself may contain coding or instructions (such as an iFrame) that, when executed on listing system 130, configure display of the enhanced financing information. In some embodiments, the configured graphical user interface may be presented separately, and may be accessible by buyer system 120 on demand while utilizing listing system 130. In other embodiments, financial service system 110 and listing system 130 may fully integrate the graphical user interface into listing system 130, such that any individual property listing that buyer system 120 investigates will contain the enhanced buyer financial information and potential information on financing times.

Once configured, financial service system 110 and listing system 130 may provide the token information and associated configured graphical user interface to buyer system 120 (Step 680). Buyer system 120 may utilize the enhanced financial information and financing term information to provide a potential buyer operating buyer system 120 with information assisting the potential buyer in making more informed shopping decisions while utilizing listing system(s) 130.

Figure 7:
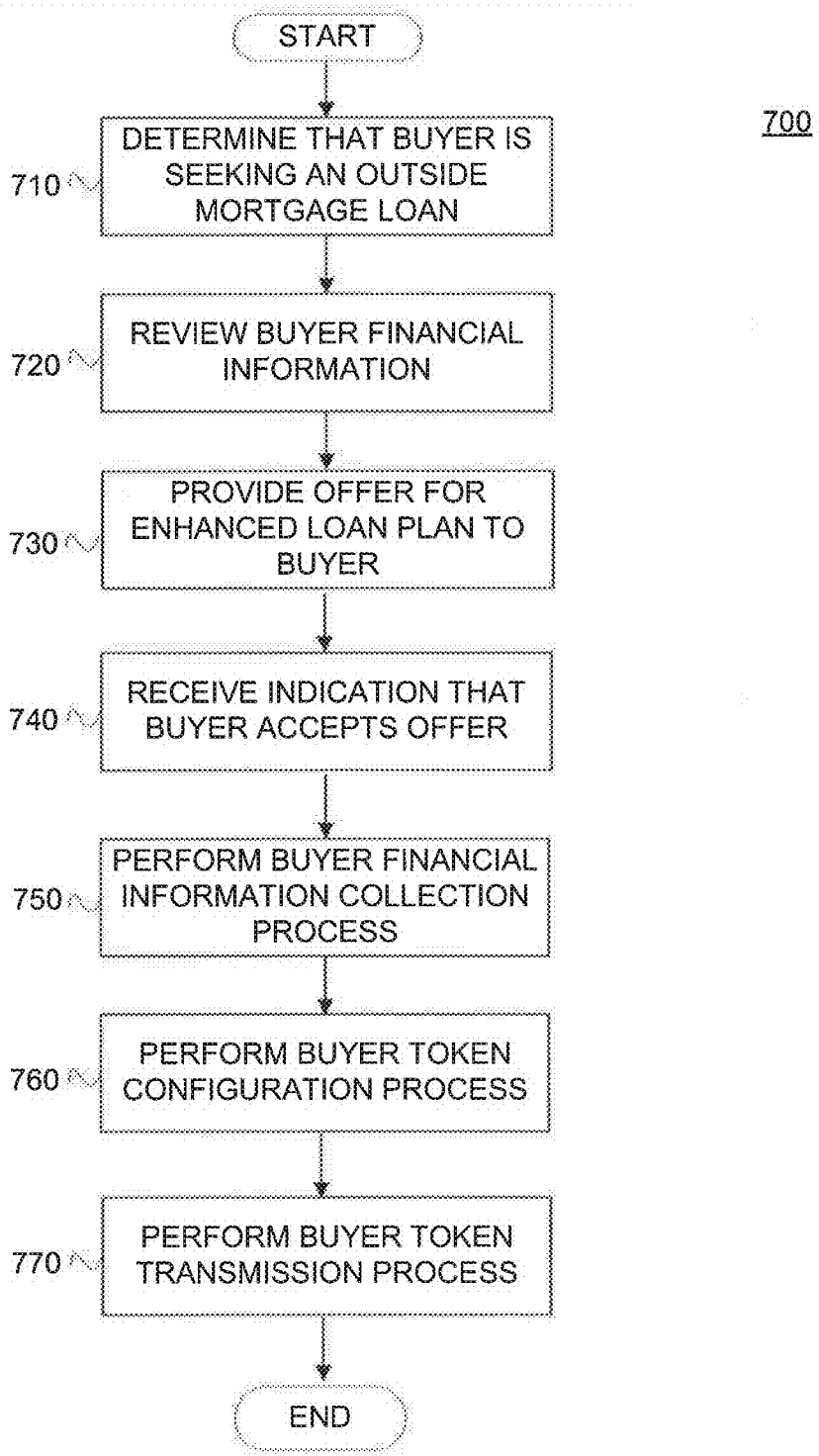
FIG. 7 is a flowchart of an exemplary buyer external loan facilitation process, consistent with disclosed embodiments.

In some embodiments, the disclosed embodiments may enable financial service system 110 to detect that an existing customer of financial service provider 105 is attempting to buy a piece of property, and may proactively assist the prospective buyer. FIG. 7 illustrates an exemplary buyer external loan facilitation process 700 consistent with certain disclosed embodiments. Process 700, as well as any or all of the individual steps therein, may be performed by any one or more of financial service system 110, buyer system 120, or listing system(s) 130. For exemplary purposes, FIG. 7 is disclosed as being performed by financial service system 110.

Financial service system 110 may determine that a customer of financial service provider 105 is seeking a mortgage loan (Step 710). In some embodiments, system 110 may receive a direct indication from buyer system 120 that the associated prospective buyer is seeking a mortgage loan. In other embodiments, financial service system 110 may determine that the loan is being sought through other indirect means. For example, financial service system 110 may detect that a third party known to offer mortgage loans has ordered a comprehensive credit report for the prospective buyer from one or more credit bureaus. These comprehensive reports, which may be referred to as "hard credit pulls," may only be conducted with the prospective buyer's consent, and therefore would indicate that the prospective buyer may be initiating contact with the third party entity for purposes of securing a mortgage loan. Financial service system 110 may actively monitor the prospective buyer's credit report at regular intervals to detect such activity. For example, system 110 may perform a "soft pull"—a limited view of the prospective buyer's creditworthiness information that can be performed without the user's consent, such as those performed by credit card marketers. Alternatively, financial service system 110 may be configured to passively react to changes in a customer's credit history. For example, certain criteria may trigger an automated "flag" that sends an automatic notification to one or more entities associated with financial service system 110 and financial service provider 105. The criteria may include a hard credit pull as described above. In other embodiments, an automated flag and notification may be triggered, for example, if the user makes a purchase exceeding a set amount, or changes their mailing address.

Upon receiving either a direct or indirect indication that an associated customer is seeking a mortgage loan from a third party, financial service system 110 may review financial information associated with the prospective buyer (Step 720). In some embodiments, the financial information reviewed may be related to potential terms for a mortgage loan or other financing for a purchase. The financial information may include, but not be limited to, the prospective buyer's income, financial assets, investments, tax liabilities, personal or demographic information, employment history, or any other piece of information that would be relevant to the terms that would be offered to the buyer in initiating financing for a purchase.

Similar to the processes described previously, financial service system 110 may prepare and provide an offer for an enhanced loan financing plan to buyer system 120 (Step 730). Financial service system 110 may notify buyer system 120 of the offer through telephonic, electronic communication means, or any other suitable means of communication. In some embodiments, financial service system 110 may determine that additional information is required in order to make the determination of whether or not to make the offer to buyer system 120. In these embodiments, financial service system 110 may request the additional information from buyer system 120 through telephonic or electronic communication means. Financial service system 110 may receive an indication that the user operating buyer system 120 accepts the offer to participate in the enhanced loan program, also via telephonic or electronic communication means (Step 740).

In some embodiments, the prospective buyer operating buyer system 120 may already be a customer of financial service provider 105, and financial service system 110 may be able to automatically access, process, and analyze enhanced financial information associated with the prospective buyer. In these embodiments, financial service system 110 may perform a buyer financial information collection process (Step 750). The buyer financial information collection process may be substantially similar to buyer financial information collection process 400 disclosed above. In alternative embodiments, the buyer associated with buyer system 120 may not be a customer of financial service provider 105, or financial service system 110 may otherwise not be able to readily access sufficient financial information about the buyer. In these embodiments, financial service system 110 may contact the buyer and prompt them for the financial information. This process may be substantially similar to that disclosed as buyer information collection process 200 above.

At Steps 760 and 770, financial service system 110 may perform a buyer token configuration and a buyer token transmission process. In some embodiments, these processes may be substantially as described above in association with FIGS. 5 and 6 and associated processes 500 and 600. Financial service system 110, however, may alter one or more steps of one or both processes for the particular circumstances of the prospective buyer and the desired transaction. For example, financial service system 110 may alter the buyer token configuration process to make the loan information program more attractive than the other mortgage programs that the prospective buyer is considering. These considerations are understood to be based on particular facts associated with a given situation, and they may vary on a case-by-case basis.

FIG. 8 shows an exemplary user interface that may be provided by the disclosed embodiments for receiving enhanced user information. For example, as described above in association with buyer information collection processes 200 and 300, financial service system 110 may configure a financing website or user interface to receive prospective buyer financial information from buyer system 120. Aspects of the disclosed embodiments include software processes that, when executed by processors 111 and 121, generate and provide the content, questions, solicitations, etc. included in the user interface provided to buyer system 120 to upload, receive, and process the information. In some embodiments, buyer system 120 may select desired answers from drop-down menus. In other embodiments, the prospective buyer may be able to type in answers to the queries using a user input/output device (touchscreen, keyboard, voice command, or other suitable input mechanism) associated with buyer system 120, as shown in FIG. 8. Aspects of the disclosed embodiments may allow the customer to upload the requested documents, such as government-issued identification, proof of income via pay stubs or bank statements, etc. in any suitable electronic format, including, for example, JPEGs, GIFs, PDFs, spreadsheets, or text files. The user interface of FIG. 8 is exemplary and not limiting to the aspects of the disclosed embodiments. Other formats, types of content, queries, mechanisms for uploading, etc. can be implemented to allow financial service system 110 to receive and process buyer information from buyer system 120.

Figure 9:
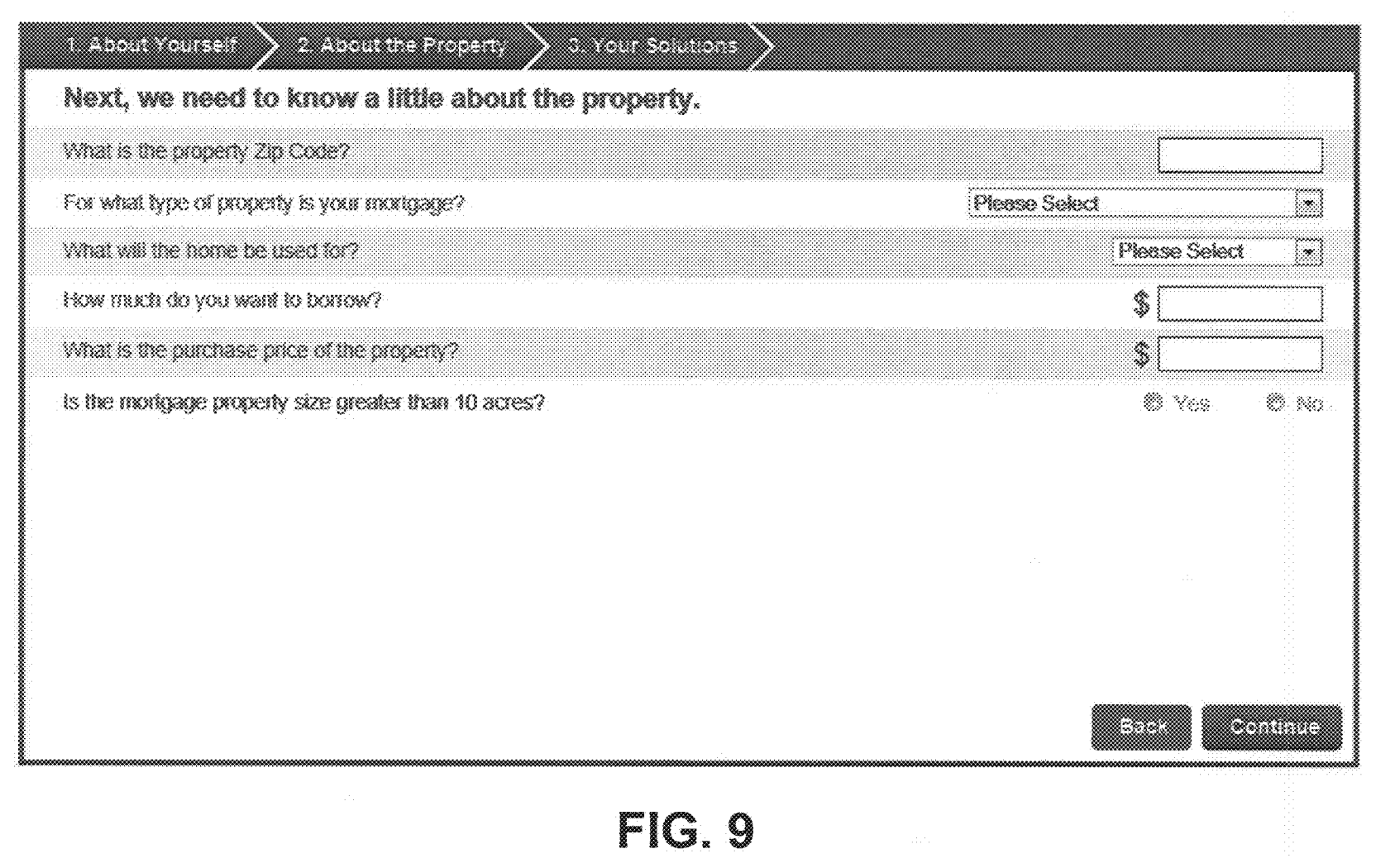

FIG. 9 shows an exemplary user interface that may be provided by the disclosed embodiments to facilitate submission of additional prospective buyer financial information, as well as general information about an item to be purchased. For example, as described above in association with buyer information collection processes 200 and 300, financial service system 110 may configure a financing website to receive general information from buyer system 120 relating to the item desired to be purchased, such as a type of home or size. In some embodiments, the information received via the user interface may be included in the buyer "token" transmitted to listing system(s) 130 as part of buyer token configuration process 500 and buyer token transmission process 600 described above. Listing system(s) 130 may use the included information to better match potential items or properties with the user operating buyer system 120. Aspects of the disclosed embodiments include software processes that, when executed by processors 111 and 121, generate and provide the content, questions, solicitations, etc. included in the user interface provided to buyer system 120 to receive, and process the information. Queries presented to the customer may include, but are not limited to, whether the vehicle is new or used, the year, make, and model of the vehicle, and optional items such as trim patterns, accessories, etc. Aspects of the disclosed embodiments may allow buyer system 120 to select answers to the various queries presented. In some embodiments, buyer system 120 may select desired answers from drop-down menus. In other embodiments, the prospective buyer may be able to type in answers to the queries using a user input/output device (touchscreen, keyboard, voice command, or other suitable input mechanism) associated with buyer system 120, as shown in FIG. 9. The user interface of FIG. 9 is exemplary and not limiting to the aspects of the disclosed embodiments. Other formats, types of content, queries, mechanisms for uploading, etc. can be implemented to allow financial service system 110 to receive and process general desired item information from buyer system 120.

FIG. 10 shows an exemplary user interface that may be provided by the disclosed embodiments to facilitate submission of additional prospective buyer financial information, as well as general information about an item to be purchased. For example, as described above in association with buyer information collection processes 200 and 300, financial service system 110 may configure a financing website to receive general information from buyer system 120 relating to the item desired to be purchased, such as a type or size of a home. In some embodiments, the information received via the user interface may be included in the buyer "token" transmitted to listing system(s) 130 as part of buyer token configuration process 500 and buyer token transmission process 600 described above. Listing system(s) 130 may use the included information to better match potential items or properties with the user operating buyer system 120. Aspects of the disclosed embodiments include software processes that, when executed by processors 111 and 121, generate and provide the content, questions, solicitations, etc. included in the user interface provided to buyer system 120 to receive, and process the information. Queries presented to the customer may include, but are not limited to, questions requesting details associated with the item or service being purchased. For example, in the context of a potential car loan, the questions may include whether the vehicle is new or used, the year, make, and model of the vehicle, and optional items such as trim patterns, accessories, etc. Aspects of the disclosed embodiments may allow buyer system 120 to select answers to the various queries presented. In some embodiments, buyer system 120 may select desired answers from drop-down menus. In other embodiments, the prospective buyer may be able to type in answers to the queries using a user input/output device (touchscreen, keyboard, voice command, or other suitable input mechanism) associated with buyer system 120, as shown in FIG. 10. The user interface of FIG. 10 is exemplary and not limiting to the aspects of the disclosed embodiments. Other formats, types of content, queries, mechanisms for uploading, etc. can be implemented to allow financial service system 110 to receive and process general desired item information from buyer system 120.

FIG. 11 shows an exemplary user interface that may be provided by the disclosed embodiments to provide enhanced information about loan terms for a prospective purchase. For example, as described above in association with buyer token transmission process 600, financial service system 110 may transmit a buyer "token" to one or more listing system(s) 130, and financial service system 110, listing system 130, or both may configure a user interface such as that shown in FIG. 11 to present enhanced information pertaining to terms of a financing loan to buyer system 120. Aspects of the disclosed embodiments include software processes that, when executed by processors 111, 121, 131, 133, and 135, generate and provide the content included in the user interface provided to buyer system 120. For example, a user interface consistent with disclosed embodiments may allow the potential buyer to select different loan structures for additional information. According to some embodiments, the potential buyer may select a comparison of the different loan structures available to the potential buyer. A potential buyer may also choose a particular loan structure to continue the application process. Buyer system 120 may allow the potential buyer to select desired answers by any appropriate means, such as a mouse-click, using a user input/output device (touchscreen, keyboard, voice command, or other suitable input mechanism) associated with buyer system 120, as shown in FIG. 11. Other formats, types of content, queries, mechanisms for uploading, etc. can be implemented to allow financial service system 110 to receive and process general desired item information from buyer system 120. The user interface of FIG. 11 is exemplary and not limiting to the aspects of the disclosed embodiments. Other formats, types of content, queries, mechanisms for uploading, etc. can be implemented to allow financial service system 110 to transmit enhanced information relating to loan financing terms to buyer system 120.

Figure 12:
FIG. 12 is an exemplary user interface for providing enhanced loan qualification information for a desired purchase that may be provided by the disclosed embodiments.

FIG. 12 shows an exemplary user interface that may be provided by the disclosed embodiments to provide enhanced information about loan terms for a prospective purchase. For example, as described above in association with buyer token transmission process 600, financial service system 110 may transmit a buyer "token" to one or more listing system(s) 130, and financial service system 110, listing system 130, or both may configure a user interface such as that shown in FIG. 12 to present enhanced information pertaining to terms of a financing loan to buyer system 120. Aspects of the disclosed embodiments include software processes that, when executed by processors 111, 121, 131, 133, and 135, generate and provide the content included in the user interface provided to buyer system 120. Buyer system 120 may allow the potential buyer to select desired answers by any appropriate means, such as a mouse-click, using a user input/output device (touchscreen, keyboard, voice command, or other suitable input mechanism) associated with buyer system 120, as shown in FIG. 12. The user interface of FIG. 12 is exemplary and not limiting to the aspects of the disclosed embodiments. Other formats, types of content, queries, mechanisms for uploading, etc. can be implemented to allow financial service system 110 to transmit enhanced information relating to loan financing terms to buyer system 120.

The disclosed embodiments improve upon existing "mortgage predictor" solutions by improving both the scope and accuracy of financial information available to a prospective buyer during the shopping process. Purchase of a large item—especially a home—may invoke emotional decision-making rather than rational consideration. Mistakes made in this process are not easily undone. Accordingly, by assembling the prospective buyer's full financial profile and creating a portable "token" that the buyer can take with them to various inventory listing sites, the disclosed embodiments can serve as an extra layer of protection and confidence for buyers, sellers, and associated financial institutions. The disclosed embodiments provide, among other things, enhanced information availability, convenience, and security.

Other features and functionalities of the described embodiments are possible. For example, the processes of FIGS. 2-7 are not limited to the sequences described above. Variations of these sequences, such as the removal and/or the addition of other process steps may be implemented without departing from the spirit and scope of the disclosed embodiments.

Additionally, the disclosed embodiments may be applied to different types of sales. Any financial service institution that provides loan accounts to customers may employ systems, methods, and articles of manufacture consistent with certain principles related to the disclosed embodiments. In addition, any buyer or seller of any piece of real or personal property may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects can also be stored on and executed from many types of non-transitory computer-readable media, such as secondary storage devices, like hard disks, floppy disks, or CD-ROM, or other forms of RAM or ROM. Accordingly, the disclosed embodiments are not limited to the above described examples, but are instead defined by the appended claims in light of their full scope of equivalents.

What is claimed is:

1. A system for providing enhanced information relating to financing, the system comprising:
   a memory storing instructions; and
   a processor configured to execute the instructions to:
   receive, from a physical media, a configured personalized software object token, wherein the software object token further comprises a first application programming interface;
   transfer a set of financial information associated with a buyer to the configured personalized software object token;
   configure controlled access to a first subset of financial information of the software object token;
   configure a second application programming interface to display for an external system;
   determine whether the buyer does not have an account with the external system;
   upon the determination that the buyer does not have an account with the external system, then configure an account for the buyer with the external system by:
      configuring a third application programming interface to display for the buyer,
      receiving a second subset of financial information from the buyer via the third application programming interface,
      verifying the second subset of financial information, and
      integrate the first, second, and third application programming interfaces by connecting the financial information, and the verified information;
   transfer the software object token to the external system;
   determine financing information comprising prospective financing terms for at least one item contained within an external system inventory listings based on the connected information;
   provide financing information to the buyer via the second programming interface;
   upon the determination that the buyer does have an account with the external system, then:
      transfer the software object token to the external system;
      determine financing information comprising prospective financing terms for at least one item contained within an external system inventory listings based on the first subset of financial information;
      provide financing information to the buyer via the second programming interface.

2. The system of claim 1, wherein the financing information comprises a mortgage loan and the item to be purchased is a parcel of real estate.

3. The system of claim 1, wherein transferring the set of financial information associated with the buyer further comprises accessing the financial information from a system associated with a financial service account of the buyer.

4. The system of claim 1, wherein configuring controlled access further comprises configuring at least one of encryption, password protection, or implementation of security questions.

5. The system of claim 4, wherein configuring controlled access further comprises implementing OAuth 2.0 authorization for the application programming interface.

6. The system of claim 1, wherein the determined financing information comprises at least one of loan amount, interest rate, monthly payment amount, tax information, insurance information, closing costs, or information on the variability of the interest rate.

7. The system of claim 1, wherein the processor is further configured to execute the instructions to configure the second application programming interface to display only to buyers for which a software object token has been configured.

8. A method for providing enhanced information relating to financing, the method comprising:
receiving from a physical media a configured personalized software object token, wherein the software object token further comprises a first application programming interface;
transferring a set of financial information associated with a buyer to the configured personalized software object token;
configuring controlled access to a first subset of financial information of the software object token;
configuring a second application programming interface to display for an external system;
determining whether the buyer does not have an account with the external system;
upon the determination that the buyer does not have an account with the external system, then configuring an account for the buyer with the external system by:
configuring a third application programming interface to display for the buyer,
receiving a second subset of financial information from the buyer via the third application programming interface,
verifying the second subset of financial information, and
integrating the first, second, and third application programming interfaces by connecting the financial information, and the verified information;
transferring the software object token to the external system;
determining financing information comprising prospective financing terms for at least one item contained within an external system inventory listings based on the connected information; and
providing financing information to the buyer via the second programming interface;
upon the determination that the buyer does have an account with the external system, then:
transferring the software object token to the external system;
determining financing information comprising prospective financing terms for at least one item contained within an external system inventory listings based on the first subset of financial information; and
providing financing information to the buyer via the second programming interface.

9. The method of claim 8, wherein the financing information comprises a mortgage loan and the item to be purchased is a parcel of real estate.

10. The method of claim 8, wherein transferring the set of financial information associated with the buyer further comprises accessing the financial information from a system associated with a financial service account of the buyer.

11. The method of claim 8, wherein configuring controlled access to a financial information subset further comprises configuring at least one of encryption, password protection, or implementation of security questions.

12. The method of claim 11, wherein configuring controlled access for the application programming interface further comprises implementing OAuth 2.0 authorization for the application programming interface.

13. The method of claim 8, wherein the determined financing information comprises at least one of loan amount, interest rate, monthly payment amount, tax information, insurance information, closing costs, or information on the variability of the interest rate.

14. The method of claim 8, further comprising configuring the second application programming interface to display only to buyers for which a software object token has been configured.

15. A non-transitory computer-readable medium storing instructions that, when executed by a processor, cause the processor to perform operations comprising:
receiving, from a physical media, a configured personalized software object token, wherein the software object token further comprises a first application programming interface;
transferring a set of financial information associated with a buyer to the configured personalized software object token;
configuring controlled access to a first subset of financial information of the software object token;
configuring a second application programming interface to display for an external system;
determining whether the buyer does not have an account with the external system;
upon the determination that the buyer does not have an account with the external system, then configuring an account for the buyer with the external system by:
configuring a third application programming interface to display for the buyer,
receiving a second subset of financial information from the buyer via the third application programming interface,
verifying the second subset of financial information, and
integrating the first, second, and third application programming interfaces by connecting the financial information, and the verified information;
transferring the software object token to the external system;
determining financing information comprising prospective financing terms for at least one item contained within an external system inventory listings based on the connected information; and
providing financing information to the buyer via the second programming interface;
upon the determination that the buyer does have an account with the external system, then:
transferring the software object token to the external system;
determining financing information comprising prospective financing terms for at least one item contained within an external system inventory listings based on the first subset of financial information; and
providing financing information to the buyer via the second programming interface.

16. The non-transitory computer readable medium of claim 15, the operations further comprising:
configuring the second application programming interface to display only to buyers for which a token has been configured.

17. The non-transitory computer readable medium of claim 15, the operations further comprising:

receiving a template for the respective programming interfaces from the external system.

18. The non-transitory computer readable medium of claim 15, the operations further comprising:

recommending one or more items for sale associated with the external system inventory listings to the buyer within the second application programming interface based on at least the financial information contained within the software object token associated with the buyer.

\* \* \* \* \*